March 12, 1935. F. H. KLIE 1,994,105
FLEXIBLE FAN HANDLE
Filed Sept. 6, 1934
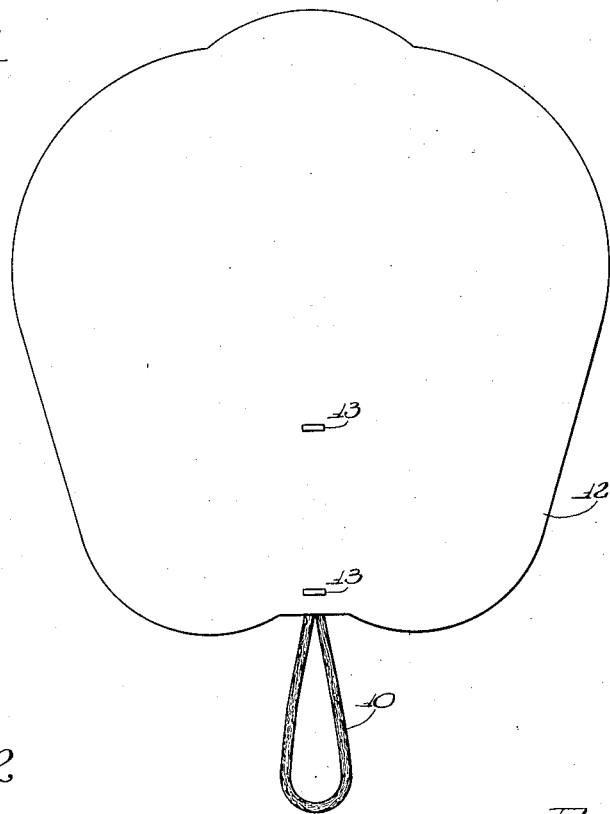
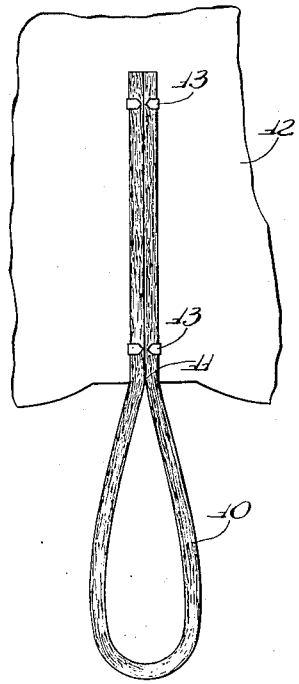
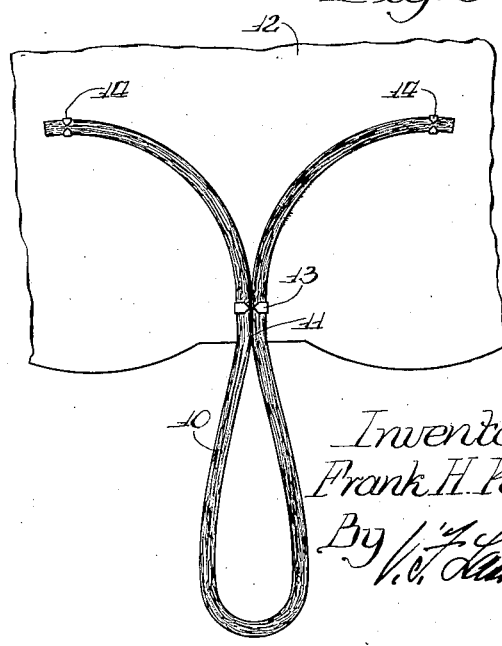
Inventor
Frank H. Klie Patented Mar. 12, 1935

1,994,105

UNITED STATES PATENT OFFICE 1,994,105

FLEXIBLE FAN HANDLE

Frank H. Klie, Chicago, Ill.

Application September 6, 1934, Serial No. 742,893

4 Claims. (Cl. 230—266)

My invention relates to handles for fans or the like and is directed to improvements in the structure and in the material used for the handle.

Heretofore, handles for cardboard fans, or the like, have consisted either of a single rigid stick or of wire bent or looped in such manner as to provide a handle and attaching ends. The stick type lacks flexibility and is too slender to afford a proper grip for the hand. The wire type is costly, easily deformed, and, unless made of wire so large and heavy as to prohibit its use does not afford a comfortable grip.

The primary object of my invention, accordingly, is to provide a cheap and durable handle that is light in weight, flexible with relation to the fan blade, and soft or yieldable when gripped or held in a user's hand. With this in view, I have devised a handle made of a suitable length of rattan, reed, or similar material having the qualities of lightness, flexibility and strength needed in the production of the improved article of my invention.

My invention, therefore, resides in the improved fan and handle construction and character of handle material used, all as hereinafter described and claimed, and illustrated on the accompanying drawing, where Figure 1 is a front view of a fan embodying my invention;

Figure 2 is an enlarged detail rear view of the handle and portion of the fan blade showing one form of connection between the blade and handle; and Figure 3 is a similar view of a second form of blade and handle connection.

In the practice of my invention, I preferably employ as material for the fan handle a suitable length of standard commercial reed or rattan, such as used in the manufacture of certain types of furniture, etc. The required length of rattan is looped or bent into the shape shown on the drawing to provide an elongated, substantially oval, handle portion 10 and an attaching portion, or shank, consisting of the two arms or end portions of the length of rattan brought into contiguous relation where they join the fan blades to form a neck as at 11, and secured to the fan blade 12 in parallel relation by means of staples 13 the branches of which are passed through the fan blade and are bent down over the respective arms of the attaching portion or shank of the handle.

As an alternative to the parallel relation of the attaching arms illustrated in Figures 1 and 2, the arms may be spread or bent away from each other at the neck 11, as shown on Figure 3, and the ends thereof secured to the fan blade by individual staples 14 similar to the larger staples 13. This has the advantage of affording a broader base on the handle and serves to yieldably brace or reinforce the fan blade.

A handle of the character above disclosed retains the flexible and yielding qualities of the material of which it is composed and therefore allows a certain amount of bend or yield between the handle and blade during use of the fan. Also, the hand portion or loop of the handle is soft and yieldable to the grip of the user and of sufficient size to afford a comfortable and secure hold. Moreover, all the advantages of the improved structure are obtained without increase in cost of manufacture and by use of cheap and easily procurable elements.

What is claimed is:

1. A fan having a blade and a unitary handle and shank composed of a single length of reed doubled upon itself and having an elongated loop constituting the gripping portion of the handle and parallel contiguous arms constituting the shank portion, and a plurality of staples the branches of which pass through the blade adjacent the outer sides of the shank and extend around the respective arms of the shank and clamp same to the blade.

2. A fan having a blade and a unitary handle and shank composed of a single length of reed doubled upon itself and having an elongated loop constituting the gripping portion of the handle and arms disposed in parallel contiguous relation at the neck of said gripping portion and extending therefrom as the shank portion of the handle, and fastening means permanently securing the respective shank arms to one side of the blade.

3. A fan having a blade and a unitary handle and shank composed of a single length of flexible and resilient fibrous material of rod-like form doubled upon itself and forming an elongated loop closed at the junction of the handle with the fan blade to form a neck from which the ends of said length of material extend as the attaching portion of the handle, and means permanently securing said ends to one side of the blade.

4. A fan having a blade and a unitary handle and shank composed of a single length of reed doubled upon itself into elongated looped form to constitute the gripping portion of the handle, said loop being closed at the junction of the handle with the fan blade to form a neck from which the ends of said length of material extend in diverging relation over the blade, and means permanently securing said divergent ends to the blade.

FRANK H. KLIE.